Jan. 14, 1941.  F. M. REID  2,228,534
TRAILER CONTROL MECHANISM
Filed May 17, 1939   2 Sheets-Sheet 1
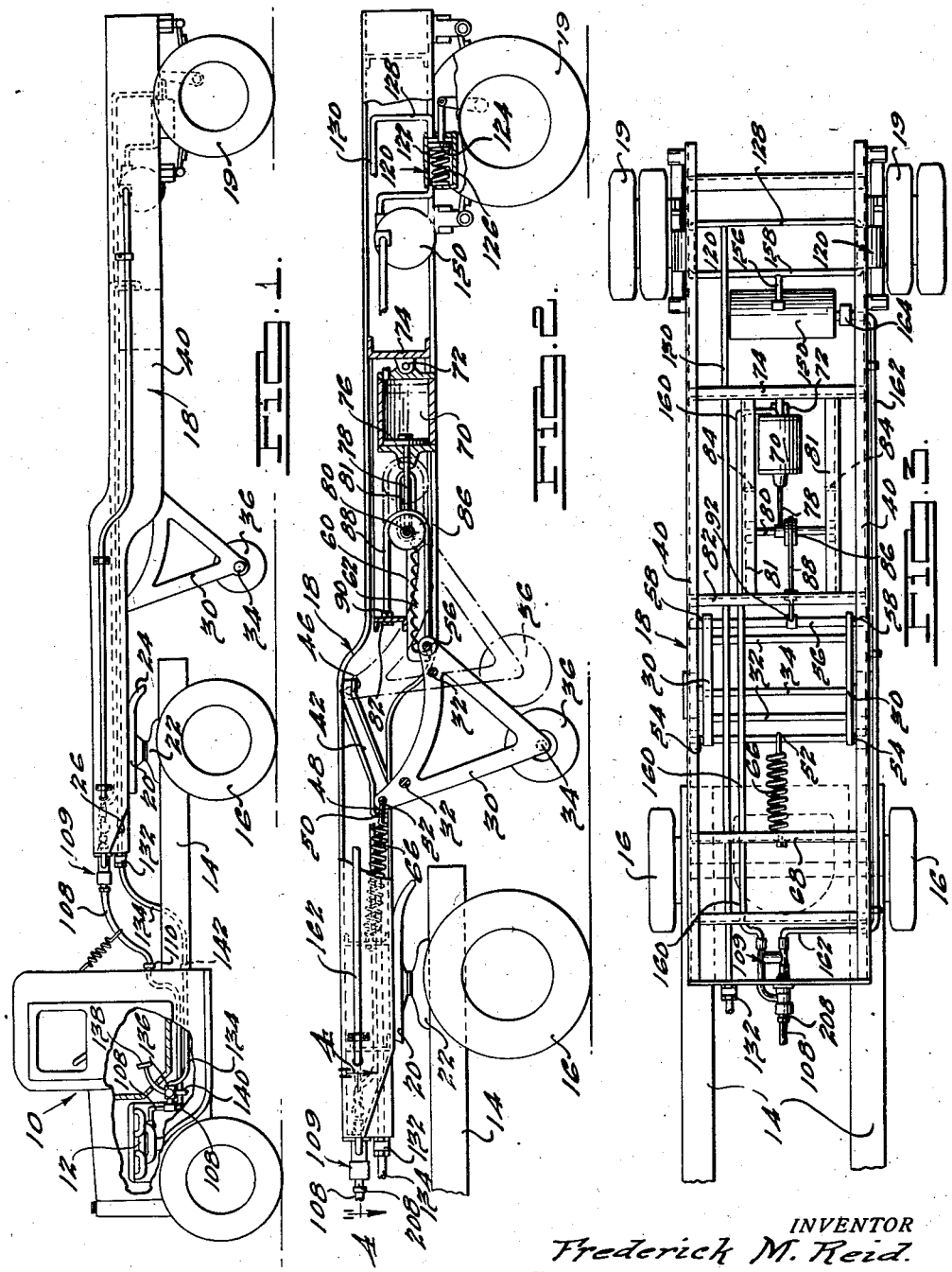
INVENTOR
*Frederick M. Reid.*
BY
*Harness, Dickey & Pierce*
ATTORNEYS.

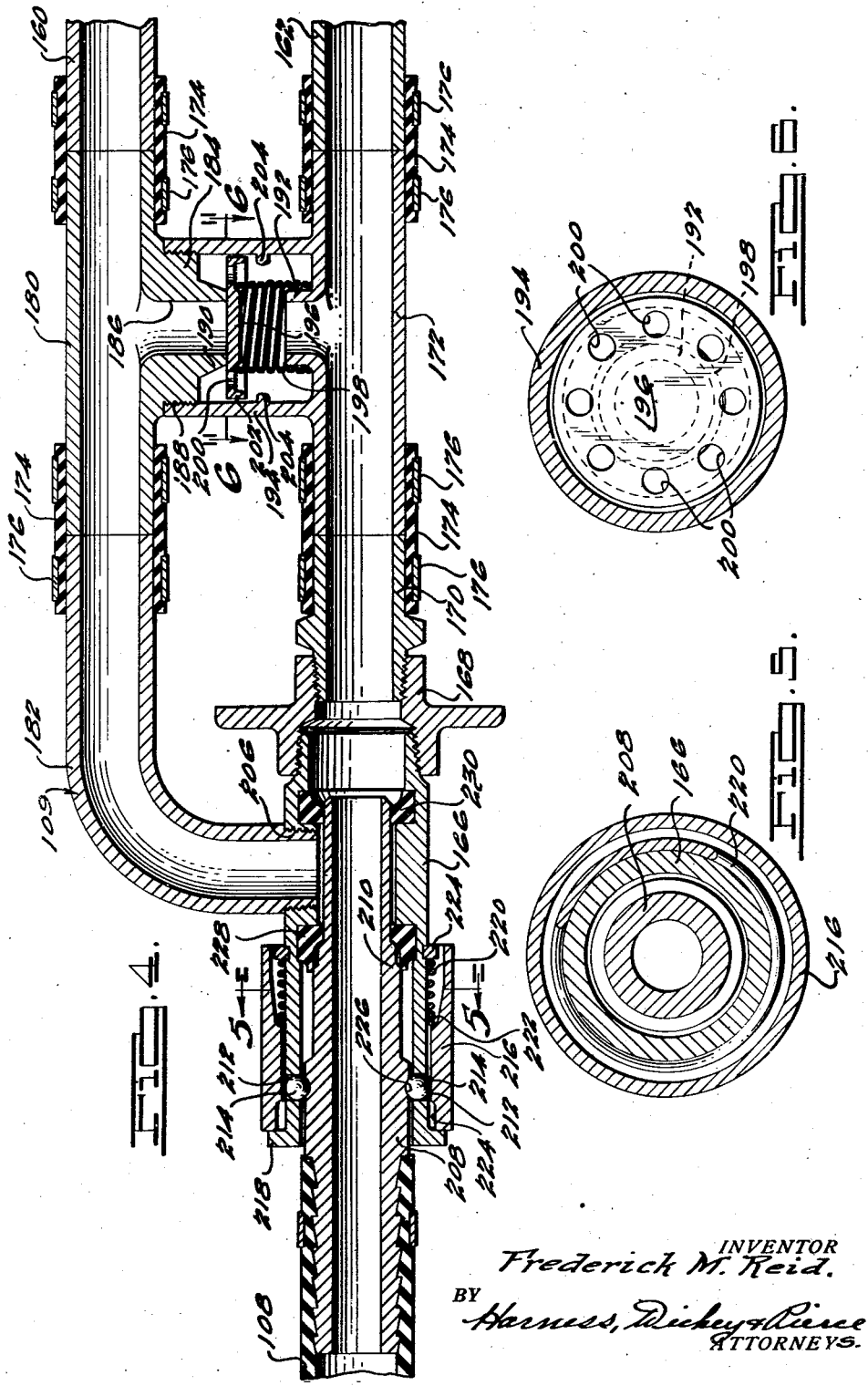

Patented Jan. 14, 1941

2,228,534

UNITED STATES PATENT OFFICE 2,228,534

TRAILER CONTROL MECHANISM

Frederick M. Reid, Detroit, Mich., assignor to Fruehauf Trailer Company, Detroit, Mich., a corporation of Michigan Application May 17, 1939, Serial No. 274,236

8 Claims. (Cl. 280—33.1)

The present invention relates to pneumatic control mechanisms and particularly to such mechanisms in association with pneumatically operated mechanisms which are associated with tractor and trailer vehicle structures.

One of the primary objects of the present invention is to provide an improved pneumatic control mechanism having a connection with a pneumatic source and associated with a plurality of functionally different devices, which is so constructed that when the connection between the source and the devices is broken, or the source is otherwise depleted, the control mechanism functions so that the break or the depletion do not affect the function of one of the devices.

Another object of the invention is to provide an improved pneumatic control mechanism of the type mentioned which is so constructed that a break in the connection between the source and the functionally different devices, or depletion of the source, may or may not affect the function of either or both of the devices under different, fitting conditions.

A more specific object of the present invention is to provide an improved pneumatic control mechanism associated with tractor and trailer vehicle structures in which a pneumatically operated retractable support and pneumatic brakes are provided on the trailer and connected to the intake manifold of the tractor engine, in which the pneumatic control mechanism is so constructed that in the event the connection between the source and the support and brakes is deliberately broken, the brakes are moved to braking position and the retractable support is moved to its supporting position; while if the connection is accidentally broken or the source otherwise depleted while the tractor and trailer are connected together such break or depletion is ineffective on the retractable support so that such support is maintained in its raised position.

Other objects of the invention will become apparent from the following specification, the drawings relating thereto and from the claims hereinafter set forth.

In the drawings, in which like numerals are used to designate like parts in the several views throughout:

Figure 1 is a side elevational view of a tractor and trailer structure, with a portion of the tractor broken away, illustrating an embodiment of the present invention;

Fig. 2 is a fragmentary side elevational view with parts broken away showing parts in elevation and parts in cross section of the structure illustrated in Fig. 1 on a slightly enlarged scale;

Fig. 3 is a top plan view on a slightly reduced scale of the structure illustrated in Fig. 2;

Fig. 4 is an enlarged cross-sectional view taken substantially along the line 4—4 of Fig. 2;

Fig. 5 is an enlarged cross-sectional view taken substantially along the line 5—5 of Fig. 4; and Fig. 6 is an enlarged cross-sectional view taken substantially along the line 6—6 of Fig. 4.

Referring to the drawings, a usual automotive tractor 10 is provided having a usual gasoline engine 12, and being provided with a rearwardly extending frame 14 with ground wheels 16 connected thereto adjacent the rear end thereof in the usual way.

A semi-trailer generally indicated at 18 has ground engaging wheels 19 mounted at the rear end thereof in the usual way. The forward end of the trailer is upwardly offset and is pivotally and detachably connected to the tractor 10 by a pivotal connection such as the fifth wheel structure. The fifth wheel structure is preferably of the type disclosed in detail in the patent to Frederick M. Reid, No. 1,925,279, issued September 5, 1933; and includes a downwardly directed king-pin member mounted on the trailer 18 adjacent the front thereof. The king-pin is adapted to engage a lower fifth wheel member 20, of the structure disclosed in the above mentioned patent, which is pivotally connected to the frame 14 through brackets 22. The lower fifth wheel member 20 is preferably curved downwardly adjacent the rear edge thereof as indicated at 24 and the front edge of the trailer 18 is preferably sloped downwardly and rearwardly as indicated at 26, so that as the tractor 10 is backed under the forward edge of the trailer 18 the downwardly sloping edge 24 slidably engages under the sloping edge 26 and raises the forward end of the trailer 18 as the fifth wheel member is slid under the trailer to its position surrounding the king-pin.

According to the present invention, the means for supporting the forward end of the trailer when it is detached from the tractor comprises a rigid frame 30 which is of a triangular shape, there being one such frame carried on each side of the trailer frame. Transversely extending bracing members 32 connect the side frame members 30 so that the members 30 are caused to move in unison as they are swung to and from supporting and non-supporting positions. A transversely extending axle member 34 is received through openings in the bottom end of each of the triangular frame members 30 and is adapted to pivotally support wheels 36 which are adapted to engage the ground when the frame 30 is in its supporting position and which are adapted to be raised above the ground when the trailer is connected to the tractor.

The frame of the trailer 18 preferably includes longitudinally extending channel members 40 forming the sides thereof; and mounted on each side of the trailer frame is a slideway 42 which is disposed at an angle to the vertical and has a substantially straight portion 46 adjacent the termination of its upper end and a substantially straight portion 48 adjacent the termination of its lower end. The guideway has an end wall 50 which acts as a stop to limit the travel of one end of the frame member 30 in a manner which will become more apparent from the following description. A transversely extending rod member 52 is received through openings in the upper forward ends of the frame members 30 and projects outwardly beyond each of the members 30. The outwardly projecting portions 54 are adapted to be slidably received in the slideways 42, so that as the portions 54 slide upwardly within the slideways the forward end of the frame member 30 is lifted upwardly; and conversely as the portions 54 move downwardly, the forward end of the frame members 30 are moved downwardly.

Another transversely extending rod member 56 is disposed through openings in the rear upper ends of the members 30 and extends outwardly therebeyond as indicated at 58. The outwardly extending portions 58 are slidably carried by slideways formed by the lower inwardly disposed flanges on the side channel members 40; and to guide and to limit the sliding movement of the portions 58 on the side frame members 40 a substantially U-shaped member 60 is fixed to the frame members 40 so that the ends of the members 60 limit the movement of the projection 58. The base of the member 60 is provided with downwardly extending recesses in the form of notches 62 which are adapted to lock the frame against accidental displacement when it is in its supporting position. While it is preferable to have the latter mentioned slideways substantially horizontal, such slideways could be disposed at slight angles to the horizontal and at substantial angles to the angle of the slideways 42.

The supporting frame members 30 are so positioned that they tend to drop downwardly by gravity to their supporting position. In order to insure the positioning of the frame members 30 in their supporting position, a spiral spring member 66 is attached at one end to the cross-member 52 and is attached at its opposite end to a transversely extending frame member 68 on the trailer 18. The slope of the slideway 42 controls to a certain extent the necessity for the spring 66 and the required strength of the spring 66; that is, for a relatively steep incline on the slideway 42 a spring of less strength is required. It is, however, desirable that the spring 66 be provided so that as the projections 54 are drawn downwardly on the guideways 42, they are held against the end wall 50 so that the projections 58 on the cross member 56 are caused to pivot around the projections 54 and engage in one of the notches 62 when the trailer is supported on the frame 30.

Also according to the present invention, in order to raise the frame 30 to its non-supporting or inoperative position, a vacuum cylinder 70 is provided which is pivotally attached at 72 to a transversely extending frame member 74 which is attached to the side frame members 40. The cylinder 70 has a reciprocating piston 76 therein with a piston rod 78 projecting therefrom. The piston rod 78 is secured to a transversely extending rod member 80 which is slidably received within guideways formed by longitudinally extending channel members 81 which are fixed at one end to the transversely extending frame member 74 and at their other end to another transversely extending frame member 82. The rod member 80 is adapted to be slid back and forth within the channel members 81 as the piston rod 78 is reciprocated, and stops 84 are preferably provided in the channel members 81 to limit the movement of the rod member 80.

A pulley 86 is rotatably mounted on the rod member 80; and a flexible cable 88 has one end 90 fixed to the transversely extending frame member 82. The cable is passed around the pulley 86 and is secured at 92 to the transversely extending member 56 on the frame member 30. The pulley and cable arrangement reduces the size of the cylinder 70 necessary to raise the supporting frame 30 to its inoperative position.

The ground wheels 19 at each side of the semi-trailer 18 adjacent the rear end thereof are each provided with conventional vacuum braking mechanisms generally indicated at 120. Each braking mechanism 120, which is shown by way of illustration, includes a cylinder 122 having a reciprocating piston 124 therein, which is constantly urged to a non-braking position by a spiral spring 126, mounted within the cylinder 122. A conduit member 128 communicates with the rear end of each of the cylinders 122 and is in communication with an elongated flexible conduit member 130 which extends longitudinally of the trailer 18 and is fixed to a separable connector 132. The connector 132 provides a communication between the conduit member 130 and another flexible conduit member 134 which is in communication with a conduit member 108. The conduit member 108 communicates with the intake manifold of the engine 12. Means 136 are introduced in the line 134 and are operatively connected with the foot brake pedal 138 so that when the brake pedal 138 is depressed, the lines 134, 130, and 128 are vented to the atmosphere through an atmospheric vent 140. When the brake pedal is depressed, communication between the means 136 and the intake manifold is shut off so that the vacuum in line 108 is not destroyed. A hand valve 142 may be interposed between the connection 132 and the means 136, so that when the connection 132 is broken and the pedal 138 is in its upward position, the hand valve may be closed so that the manifold is not open to the atmosphere.

A vacuum tank 150 is mounted to the trailer 18 adjacent the rear end thereof and has a conduit member 156 communicating therewith, which in turn communicates with another transversely extending conduit member 158. The conduit member 158 communicates with the interior of each of the cylinders 122 through the forward wall thereof, viewing Fig. 2.

The vacuum source for the cylinder 70, and the cylinder 150 and cylinders 122 is provided by the suction intake of engine 12. The flexible conduit member 108 provides communication with such source and is in communication with the pneumatically responsive operating means on the semi-trailer through separable connector means, generally indicated at 109. A hand valve 110 is interposed in the line between the connector 109 and the intake manifold to which the conduit 108 extends so that the hand valve may be closed when the trailer and tractor are disconnected, and open when they are connected.

The separable connector 109 is constructed to communicate with branch conduits 160 and 162. The branch conduit 160 communicates with the rear end of cylinder 70, viewing Fig. 2, of the operating means for raising and lowering the retractable support 30; and the conduit 162 communicates with the brake operating cylinders 122 through the tank 150. A check valve 164 is interposed in the line 162 adjacent the communication of the conduit 162 with the tank 150 so that when the connection 109 is broken the vacuum within tank 150 is not open to the atmosphere.

The separable connector 109 is mounted to the frame of the semi-trailer 18, preferably adjacent the front end thereof, and includes a rigid tubular portion 166 connected through aligned, separable fittings 168 and 170 with a rigid T connection 172. The fitting 170 is tubular and is connected with the horizontal portion of the member 172 by means of a resilient sealing ring 174 which is secured to the members 170 and 172 by means of bands 176. The opposite end of the horizontal portion of member 172 is connected to the conduit 162 by a similar sealing ring 174 and bands 176. The members 166, 168, 170, and 172 are aligned so that they provide a conduit communicating with the conduit 162.

The communication with conduit 160 includes a T member having one end of its horizontal portion sealably connected to conduit 160 by means of a sealing ring 174 and bands 176 and having its opposite end connected to one end of an elbow member 182 by means of a rubber ring 174 and bands 176. The member 180 has a depending portion 184 provided with a passage 186 therethrough which is externally threaded adjacent the base thereof, as indicated at 188, and which terminates in a reduced and inwardly tapered annular portion 190. The member 172 has an upwardly disposed annular shoulder 192 forming a passage which is aligned with passage 186. A concentric upstanding annular portion 194 threadably receives the threaded portion 188 of depending portion 184 so that the members 180 and 172 are connected together to provide communication between the horizontal portions of members 172 and 180.

In order to communicate the passages through the horizontal portions of members 172 and 180 or to shut off communication therebetween, a disc member 196 is disposed within tubular portion 194 and has a solid central portion which is adapted to seat against the lower annular edge of tapered portion 190. The disc member 196 is urged against its seat on portion 190 by means of a spiral spring 198 which is telescoped over the flange 192 and which bears against an annular shoulder formed on the under surface of disc 196 so that the spring cannot become displaced. The member 196 is provided with a plurality of circumferentially spaced openings 200 therethrough which are disposed on a radius outside of the outer edge of the tapered portion 190. The disc member is also formed with a depending annular flange 202 which is adapted to abut against protuberances 204 formed on the inner wall of tubular portion 194 at spaced intervals therearound so that the downward movement of member 196 is limited. It will thus be seen that when the member 196 is in its upper position and is seated against the lower edge of tapered portion 190, communication between the passages of horizontal portions of members 180 and 172 is blocked off while when the disc member 196 is unseated, communication between these passages is effected through openings 200. The function of this construction will be pointed out in detail hereinafter.

The depending end of elbow member 182 is threadably received within a tapped opening 206 in member 166 adjacent the rear end thereof. Communication is thus provided between the passage formed by member 166 and the conduit 160 through the passages formed by member 182 and the horizontal portion of member 180. The function of such communication will also be pointed out in detail hereinafter.

In order to provide the separable connection between conduit 108 and the conduits on the semi-trailer, the means 109 are provided with a separable tubular member 208 which has its forward end telescopically and fixedly received within the rear end of flexible conduit member 108. The member 208 has a reduced forward end 210 which is adapted to be telescopically received within member 166 so that the passage formed through member 208 communicates the conduit 108 with conduit member 162 and, depending upon the position of member 196, with conduit member 160.

The tubular member 208 is adapted to be fixedly positioned within member 166 but manually releasable therefrom. To provide for this, member 166 is provided with a plurality of openings 212 through the wall thereof which are adapted to receive balls 214. A suitable number of such openings and balls may be provided at spaced intervals around member 166. The balls are held in position within the openings by means of an annular sleeve 216 which slidably embraces the member 166 and which is adapted to abut against an outwardly disposed annular flange 218 formed on the forward end of member 166. The member 216 is urged to its forward position by means of a spiral spring 220 which embraces member 166. The forward end of spring 122 bears against an annular shoulder 222 formed on the inner wall of member 216, and the rear end of spring 220 abuts against an annular stop ring 224 which is fixed to member 166. The sleeve 216 is formed with an annularly enlarged space 224 adjacent the forward end thereof; and it will be seen that the construction is such that when the sleeve 216 is in its forwardmost position, the inner wall of such sleeve forces the balls radially inwardly where they seat within an annular recess 226 formed in the outer surface of member 208. When the sleeve 216 is pulled to its rear position against the action of spring 220, the tubular member 208 may be withdrawn from member 116 as the balls 214 will be urged radially outwardly by the rounded cam walls of the channel 226 and such balls may be disposed within the enlarged area formed by the annular portion 224. It is pointed out that the inner edges of openings 212 may be peened inwardly slightly so that the balls will not drop therethrough.

The member 208 extends within member 166 to a point beyond the point of communication of elbow 182 with the interior of member 166. That portion of the passage within member 166 with which the elbow 182 communicates is sealed by means of sealing rings 228 and 230, which may be of rubber or other suitable sealing material. It will thus be seen that when the member 208 is inserted within member 166 the reduced end 210 thereof is sealably embraced by rings 228 and 230 so that the passage through elbow 182 is sealed off from communication with the atmosphere or from communication with the interior of member 208. The function of this will be described hereinafter in greater detail.

The operation and functions of the structure above described will now be described in detail:

At all times while the engine is running and the trailer is connected to the tractor 10 with the separable member 208 inserted within member 166, a vacuum is created within conduit 162 and consequently within tank 150, so that the vacuum brakes 120 may be operated. When the member 208 is first inserted into member 166, atmospheric conditions exist within conduit 160 and consequently within cylinder 70 and the retractable supports 30 are down. The creation of this vacuum within the horizontal portion of member 172 will create a pressure differential between that passage and the horizontal passage 180, so that the disc 196 will be unseated and vacuum will be created within conduit 160 and consequently within cylinder 70 and the retractable supports 30 are raised. It is pointed out that at this time the opening to the atmosphere through elbow 182 is sealed off by the inner end of member 208. When the vacuum conditions within conduit 160 are equal to the vacuum conditions within conduit 162, the spring 198 will urge the disc against its seat on tapered portion 190, so that the vacuum conditions within conduit 160 will be constantly maintained. Under these conditions, the cylinder 76 is drawn to the right of chamber 70, viewing Fig. 2, and the retractable support is maintained in its raised position.

In the event that the connection 108 becomes broken, as frequently happens due to the bending and twisting stresses which are placed upon this connection in operation, atmospheric conditions would be created within the horizontal passage of member 172 but this would not affect the vacuum conditions within the conduit 160 since the disc 196 would be urged against its seat and the atmospheric opening through elbow 182 is sealed off. Also, in the event that the vacuum within member 172 is depleted due to over-use of the brakes, leakage, or other causes, no effect would be had upon the pressure conditions within the conduit 160 since the disc 196 would be maintained against its seat. This construction therefore assures that the retractable landing gear will not drop down but will be always raised and maintained in its raised position while the tractor and trailer are connected together.

When the separable member 208 is disconnected from member 166, the conduit 160 is vented to the atmosphere through elbow 182 so that the retractable support would then be dropped to its supporting position. At the same time, the conduit 162 is vented to the atmosphere but the check valve 164 would prevent this having any effect on the vacuum within tank 150. The disconnection of member 132 would serve to vent conduit 130 to the atmosphere so that the brakes would be applied.

While the broader aspects of the present invention may be utilized in connection with structure other than tractor and semi-trailer constructions herein illustrated, the present invention has particular utility when used with such tractor and trailer constructions. Also, while the present invention is particularly adapted for use with tractors employing gasoline engines as the source of motive power, according to the broader aspects of the present invention, it is also adapted for use with tractors employing other sources of power, such as Diesel engines. In the latter event, a vacuum pump could be provided for providing the vacuum source. Also, a compressor could be used, in which event it would be merely necessary to change the inlet from the rear end of cylinder 70 to the forward end of the cylinder, so that the power stroke of the piston would be in the same direction as that described above.

Formal changes may be made in the specific embodiments of the invention described without departing from the spirit and substance of the invention, the scope of which is commensurate with the appended claims.

What is claimed is:

1. In vehicle control mechanism wherein a tractor has an automotive engine providing a pneumatic source and a semi-trailer is adapted to be connected to the trailer with a retractable supporting frame mounted on the trailer movable to and from supporting and non-supporting positions with means for moving the frame to and from supporting and non-supporting positions in which the last named means includes pneumatically responsive operating means and wherein other pneumatically responsive means are mounted on the semi-trailer and are functionally different from the first named operating means with conduit means connecting both of said operating means with said pneumatic source so that said source pneumatically affects said operating means, the combination with coupling means interposed in said conduit means between said operating means and said source, said coupling means including manually separable members and being so constructed that in the event of a break in the conduit means between the source and the coupling means, said means for moving said frame is not affected while upon separation of said separable members all of said operating means are affected.

2. In vehicle control mechanism wherein a tractor having an automotive engine providing a source of vacuum and a semi-trailer is adapted to be connected to the tractor with a retractable supporting frame movably mounted on said semi-trailer movable to and from supporting and non-supporting positions with means for moving said frame to and from supporting and non-supporting positions in which said last named means includes pneumatically responsive operating means, and wherein other pneumatically responsive operating means are mounted on said semi-trailer and have a different function than said first named operating means and wherein conduit means connect both of said operating means with said vacuum source so that said source pneumatically affects said operating means, the combination with coupling means interposed in said conduit means between said operating means and said source, said coupling means including manually separable members and being so constructed that in the event of a reduction in the vacuum in the conduit means between the source and the coupling means, said first named operating means is not affected while upon separation of said separable members, all of said operating means are affected.

3. In vehicle control mechanism wherein a tractor having an automotive engine providing a pneumatic source and a semi-trailer adapted to be coupled to the tractor in which a retractable supporting frame is movably mounted on the semi-trailer and is movable to and from supporting and non-supporting positions with means for moving the frame to and from supporting and non-supporting positions in which the last named means includes pneumatically responsive operating means, and wherein vacuum brakes are mounted on the semi-trailer and include pneumatically responsive operating means, and wherein conduit means connect said operating means with the source so that said source pneumatically affects said operating means, the combination with coupling means interposed in said conduit means between said operating means and said source, said coupling means including manually separable members and being so constructed that in the event of a break in the conduit means between the source and the coupling means said first named operating means is not affected while upon separation of said separable members all of said operating means are affected.

4. In vehicle control mechanism wherein a tractor having an automotive engine providing a source of vacuum and a semi-trailer adapted to be connected to the tractor with a retractable supporting frame mounted on said trailer movable to and from supporting and non-supporting positions with means for moving the frame to and from supporting and non-supporting positions in which the last named means includes vacuum responsive operating means, and wherein other pneumatically responsive operating means is mounted on the semi-trailer and is functionally different from the first named operating means, and wherein conduit means connect both of the operating means with the vacuum source so that said source pneumatically affects said operating means, the combination with coupling means interposed in said conduit means between said operating means and said source, said coupling means including manually separable members and being so constructed that constant pressure is maintained on said first-named operating means irrespective of the pressure on the other operating means when said separable members are connected together and said vacuum source is rendered ineffective on both of said operating means when said separable members are disconnected.

5. In vehicle control mechanism wherein a tractor is provided having an automotive engine providing a vacuum source and a semi-trailer adapted to be connected to the tractor with a retractable supporting frame mounted on the trailer and movable to and from supporting and non-supporting positions with means for moving the frame to and from supporting and non-supporting positions in which the last named means includes pneumatically responsive operating means, and wherein pneumatically responsive operating means is mounted on the semi-trailer and is functionally different from the first named operating means, and wherein conduit means connects both of said operating means with said pneumatic source so that said source pneumatically affects said operating means, the combination with coupling means interposed in said conduit means between said operating means and said source, said coupling means being formed with branch conduits, one of said conduits being connected to said first named operating means and the other conduit being connected to said second named operating means, said coupling means including means maintaining a constant pressure in said first named branch conduit irrespective of the pressure in said second named branch conduit when said separable members are connected together and being so constructed that when said separable members are disconnected both of said branch conduits are vented to the atmosphere.

6. In vehicle control mechanism wherein a plurality of functionally different mechanisms are provided in which each of said mechanisms includes pneumatically responsive operating means and wherein a pneumatic source is provided and wherein conduit means connect said source with said operating means, the combination with coupling means interposed in said conduit means between said operating means and said source, said coupling means including manually separable members, one of said members being connected to a single conduit leading to said source, another of said members having a plurality of individual conduits, one of said individual conduits leading to one of said mechanisms, and another of said individual conduits leading to another of said mechanisms, means communicating said individual conduits with each other, said last named means being so constructed that constant pressure is maintained within one of said individual conduits irrespective of the pressure in the other individual conduit when said separable members are connected together, and being so constructed that when said separable members are disconnected, both of said individual conduits are vented to the atmosphere.

7. In vehicle control mechanism wherein a tractor is provided having an automotive engine providing a vacuum source and a semi-trailer adapted to be connected to the tractor is provided with a retractable supporting frame mounted on the trailer movable to and from supporting and non-supporting positions with means for moving the frame to and from supporting and non-supporting positions in which said last named means includes pneumatically responsive operating means, and wherein other pneumatically responsive operating means is mounted on the semi-trailer and is functionally different from the first named operating means, and wherein conduit means connect the source with the operating means, the combination with coupling means interposed in said conduit means between said operating means and said source, said conduit means including manually separable members, one of said members being connected to a single conduit leading to said source, another of said members having a plurality of individual conduits, one of said individual conduits leading to said first named operating means, and another of said individual conduits leading to said second named operating means, means communicating said individual conduits with each other, said last named means being so constructed that a constant pressure is maintained in one of said individual conduits irrespective of the pressure in said another of said individual conduits when said separable members are connected together, and being so constructed that when said separable members are disconnected both of said individual conduits are vented to the atmosphere.

8. In vehicle control mechanism wherein a plurality of functionally different mechanisms are provided in which each of said mechanisms includes pneumatically responsive operating means, and wherein a pneumatic source is provided, and wherein conduit means connect the source to the operating means, the combination with coupling means interposed in said circuit means between said operating means and said source, said conduit means including manually separable members, one of said members being formed to communicate with a plurality of individual conduits, one of said individual conduits leading to one of said mechanisms, and another of said individual conduits leading to another of said mechanisms, means communicating said individual conduits with each other, and means communicating said individual conduits with the atmosphere, another of said members being connected to a single conduit leading to said source, said another of said members being adapted to close the opening leading to the atmosphere of one of said individual conduits when said separable members are connected, and being adapted to communicate with the other of said individual conduits, the construction and arrangement being such that when said separable members are connected together the pressure within said one of said individual conduits is constantly maintained irrespective of the pressure in the other of said individual conduits, and both of said individual conduits are vented to the atmosphere when said separable members are disconnected.

FREDERICK M. REID.